United States Patent Office 3,396,051
Patented Aug. 6, 1968

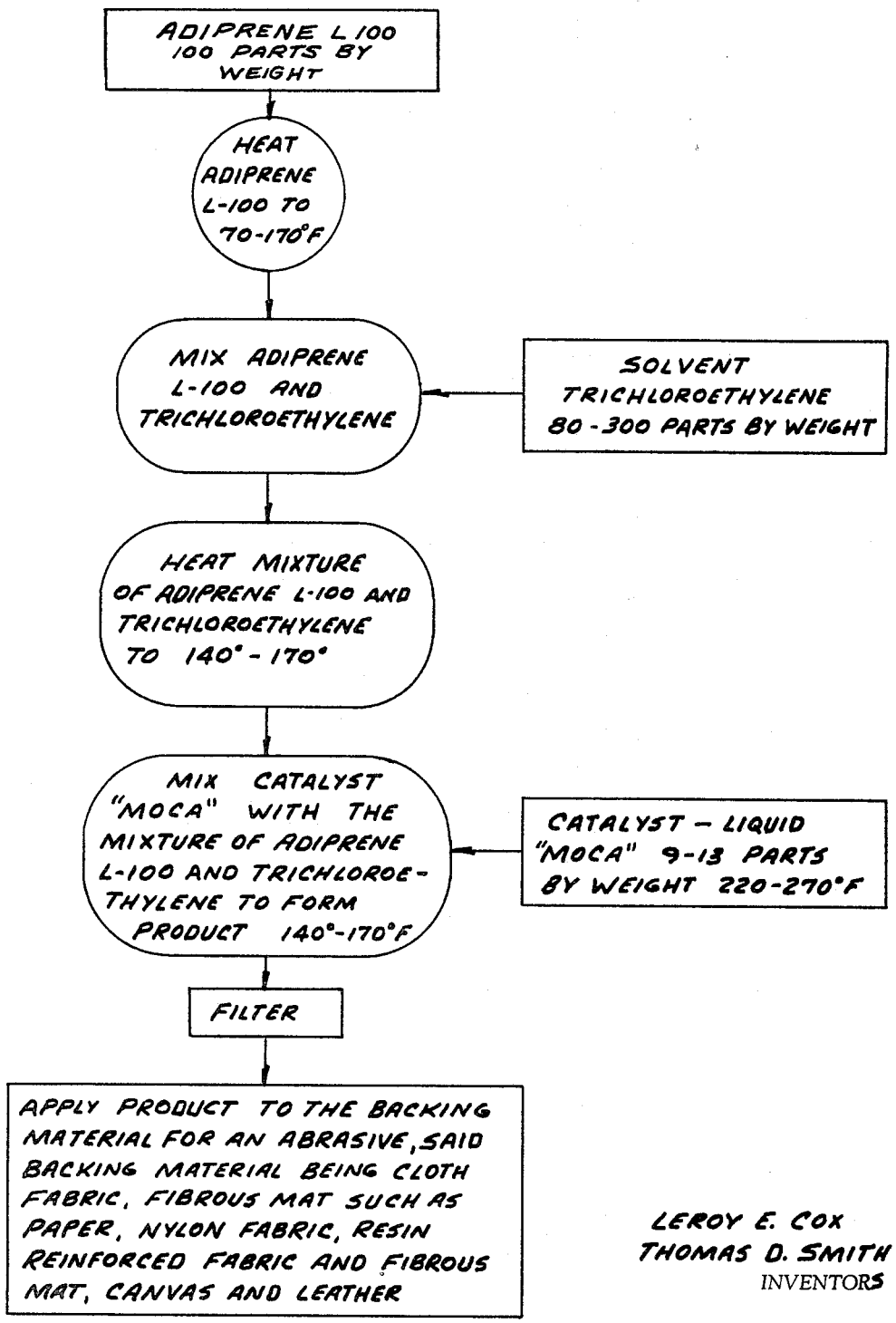

3,396,051
CHEMICAL PROCESS FOR A POLYURETHANE ELASTOMER
Leroy E. Cox, Mercer Island, and Thomas D. Smith, Bellevue, Wash., assignors to Moulded Chemical Products, Inc., Seattle, Wash., a corporation of Washington
Filed Aug. 10, 1964, Ser. No. 388,504
8 Claims. (Cl. 117—161)

ABSTRACT OF THE DISCLOSURE

This invention relates to a process for the preparation of a liquid solution of a polyurethane elastomer and the application of this elastomer to a substrate. The application of the polyurethane elastomer to a substrate such as fabric, wood, plywood and the like enhances the wearing qualities of the substrate.

---

An object of this invention is to provide a process for making a liquid solution of a polyurethane elastomer.

A further object of this invention is to provide a process for making a liquid solution of a polyurethane elastomer and which liquid solution can be readily applied to a substrate.

A still further and important object of this invention is the provision of a relatively inexpensive process for making a liquid solution of a polyurethane elastomer.

These and other important objects and advantages of the invention will be more particularly brought forth upon reference to the drawing, the detailed description of the invention and the appended claims.

Before specifically describing our invention a brief background will be presented in regard to a polyurethane elastomer. The particular elastomer of this invention is "Adiprene L," a product of E. I. Du Pont de Nemours and Company, Inc., Wilmington, Del.

The polymeric polyurethanes of Adiprene L may be conveniently prepared by several procedures. Thus, a polymeric glycol, such as polyalkyleneether glycol, an organic diisocyanate and a low molecular weight, non-polymeric glycol, with the ratio of the diisocyanate to the sum of the polymeric and non-polymeric glycols being substantially equimolar, may be reacted together to prepare polymers within the scope of the present invention. The polymeric glycol may be reacted first with a molar excess of the organic diisocyanate so as to form an isocyanate-terminated polymer and this reaction may then be followed by a chain extension step with the low molecular weight, non-polymeric glycol. Another method which may be used is to first react the low molecular weight, non-polymeric glycol with a molar excess of an organic diisocyanate and then react the resulting isocyanate-terminated product wtih the polymeric glycol. It is to be understood that in following these procedures, the polymeric glycol, organic diisocyanate and low molecular weight, non-polymeric glycol need not necessarily be the same in each instance in the preparation of any given polymer. The polymeric polyurethanes have side chains which may contain aliphatic $$-\overset{|}{\text{C}}=\overset{|}{\text{C}}-\text{ groups}$$

These side chains may be present on any one of the reactants which are used. The side chains serve as potential curing sites and the polymer may, therefore, be conveniently cured by application of a sulfur curing procedure. It is also possible to prepare polymers within the scope of the Adiprene L by reacting a polymeric glycol with a substantially equimolar proportion of an organic diisocyanate with the side chain containing the aliphatic $$-\overset{|}{\text{C}}=\overset{|}{\text{C}}-\text{ group}$$

on either one or both of these reactants. Another method which may be used is to react a mixture of two or more different polymeric glycols, such as polyalkyleneether glycol and a polyalkyleneether-thioether glycol, with the organic diisocyanate, folowed by the reaction with a low molecular weight, non-polymeric glycol, or to react one of the polymeric glycols with the organic diisocyanate, so as to prepare an isocyanate-terminated polymer, followed by the reaction with a different polymeric glycol. Here again any one or all of these reactants may have the side chain which contains aliphatic $$-\overset{|}{\text{C}}=\overset{|}{\text{C}}-\text{ group}$$

In a similar manner the bis-chloroformates of the polymeric glycol and of the non-polymeric glycol may be prepared and these then may be reacted with a substantially equimolar amount of an organic diamine having the side chain which contains an aliphatic $$-\overset{|}{\text{C}}=\overset{|}{\text{C}}-\text{ group}$$

present on either the bis-chloroformates or the diamine reactant. It is quite obvious that various modifications of any of the processes may be made in order to prepare the polymeric polyurethanes.

When preparing the polymers of Adiprene L by the reaction of glycols with diisocyanates, various high molecular weight, polymeric glycols, such as polyalkyleneether glycols, polyalkyleneether-thioether glycols, polyalkylenearyleneether glycols and polyalkylene arylene-ether-thioether glycols, may be used. These polymeric glycols should have molecular weights of at least 750; however, they may be as high as about 10,000. In general, molecular weights of 750 to 5000 are preferred. It is to be understood that any of these polymeric glycols may have side chains containing aliphatic $$-\overset{|}{\text{C}}=\overset{|}{\text{C}}-\text{ groups}$$

and when they do, the molecular weights will be increased in accordance with the molecular weights of the side chain groups.

In general, the polyalkyleneether glycols are preferred. These compounds may be represented by the formula $HO(GO)_nH$ wherein G is an alkylene radical and $n$ is an integer sufficiently large that the polyalkyleneether glycol has a molecular weight of at least 750. Not all of the alkylene radicals present need be the same. These compounds are ordinarily derived by the polymerization of cyclic ethers such as alkyleneoxides or dioxolane or by the condensation of glycols. The preferred polyalkylene-ether glycol is polytetramethyleneether glycol, also known as polybutyleneether glycol. Polyethyleneether glcol, polypropyleneether glycol, 1,2-polydimethylethyleneether glycol and polydecamethyleneether glycol are other typical representatives of this class. Polyalkyleneether glycols having side chains which contain aliphatic $$-\overset{|}{\text{C}}=\overset{|}{\text{C}}-$$

groups may be prepared by copolymerizing tetrahydrofuran with butadiene monooxide, as more particularly described in German Patent No. 914,438.

With reference to the drawing, it is seen that the process comprises heating Adiprene L-100, aproximately 100 parts-by-weight, to a temperature in the range of 70–170° F. Also, a solvent such as trichloroethylene, approximately 80–300 parts-by-weight, is mixed with the Adiprene L-100 to form a trichloroethylene-Adiprene L-100 mixture. The temperature of this mixture is adjusted to a temperature in the range of 140–170° F. A catalyst, referred to as liquid Moca, 9–13 parts-by-weight, is heated to a temperature range of 220–270° F. The catalyst, Moca, is mixed with the mixture of Adiprene L–100 and trichloroethylene and the temperature adjusted to a value in the range of 140–170° F. This forms the liquid product. However, it may be desirable to filter this liquid product. This product may be applied to the backing material for an abrasive such as cloth fabric, fibrous mat such as paper, nylon fabric, resin reinforced fabric and fabric mat, canvas and leather. The product or coating composition may be applied to the backing material by spraying on the product, brushing on the product, or dipping the material into the coating composition. From an experience standpoint, it has been found that the coating composition may be sprayed at a pressure of 35–100 pounds per square inch at room temperature or at an elevated temperature up to 170° F. Further, it has been found from experience that it is desirable to use this coating composition within a time of approximately forty-five minutes. The pot life of this solution is approximately forty-five minutes.

The coating composition may be cured at room temperature for approximately four days or may be cured at an elevated temperature of about 180° F. for six hours. However, from experience we have found one of the best ways to cure this coating composition is to let the same cure at room temperature for about four days then cure it at an elevated temperature of about 180° F. for a few hours such as six hours. It has been found that a finer product is realized by curing at an elevated temperature after curing at room temperature.

Specific examples of the manufacture of the coating composition are presented in the following. It is to be understood that these examples are illustrative only and are not to be taken as limitations on the invention.

EXAMPLE I

| Component: | Parts-by-weight, grs. |
|---|---|
| Adiprene L–100 | 250 |
| Trichloroethylene | 750 |
| Moca | 27.5 |

The Adiprene L–100 was first heated to 170° F. The trichloroethylene was slowly added to the Adiprene L–100 while continuously blending the mixture. The Moca was melted at 220° F. and blended into the mixture in the same manner. A steel roll, having a primer coat, was pre-heated to an estimated 110° F. prior to spray application. Ninety pounds air pressure was used to spray the product or coating composition. The spray gun was held at a distance of 10 inches ±2 inches while the roll was slowly rotated at 100–200 r.p.m. Upon the completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE II

| Component: | Parts-by-weight, grs. |
|---|---|
| Adiprene L–100 | 250 |
| Trichloroethylene | 750 |
| Moca | 27.5 |

The Adiprene L–100 mixture was prepared in the above-indicated quantities; however, the trichloroethylene was blended into the Adiprene L–100 when the Adiprene L–100 was at 70° F. Blending was continued for five minutes in comparision to the two minutes for the previous trial. The Moca was melted at 270° F. and was blended into the Adiprene L–100-trichloroethylene mixture while the mixture was being stirred continuously. The blending continued for one minute after slowly pouring in the Moca. Again, 90 pounds of air pressure was used to spray the coating composition from a distance of 10 inches±2 inches. This effectively vaporized the trichloroethylene. The application was made on a rotating cold roll which had been primed. After the spraying, oven heat was used to hasten the cure of the applied material. The surface temperature was 120±10° F. for ten hours. The cured film was tough and abrasion resistant.

EXAMPLE III

| Component: | Parts-by-weight, grs. |
|---|---|
| Adiprene L–100 | 250 |
| Trichloroethylene | 200 |
| Moca | 27.5 |
| Ferro red in epoxy dispersion | 6 |

The Adiprene L–100 was preheated to 170° F. and the Ferro red was preheated to 130±20° F. The Ferro red was slowly blended into the Adiprene L–100 for one minute. The trichloroethylene was added when the Adiprene L–100 was at 165° F. The Moca was melted at 240° F. and blended into the mixture when it was 150° F. Blending continued for one minute. Ninety pounds of air pressure was used to make a spray application on a primed and preheated roll (100° F.). The film was cured ten hours at 120±10° F. The cured film was tough and abrasion resistant. In this example there is a dye, Ferro red. The dye may be carried in an epoxy resin so as to have a dispersion of the dye.

There are other solvents which are compatible with the Adiprene-L and may be used in addition to the trichloroethylene. These sovlents are methylene chloride, xylene, methyl-isobutyl ketone, cyclohexanone, benzene, ethyl alcohol, carbon tetrachloride, trichloroethylene, ethylene dichloride, acetone, methyl ethyl ketone, toluene, methylchloroform, and tetrahydrofuran.

EXAMPLE IV

| Component: | Parts-by-weight, grs. |
|---|---|
| Adiprene L–100 | 250 |
| Methylene chloride | 750 |
| Moca | 27.5 |

The adiprene L–100 was first heated to 170° F. The methylene chloride was slowly added to the Adiprene L–100 while continuously blending the mixture. The Moca was melted at 220° F. and blended into the mixture in the same manner. A steel roll, having a primer coat, was pre-heated to an estimated 110° F. prior to spray application. Ninety pounds of air pressure was used to spray the product or coating composition. The spray gun was held at a distance of 10 inches ±2 inches while the roll was slowly rotated at 100–200 r.p.m. Upon completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE V

| Component: | Parts-by-weight, grs. |
|---|---|
| Adiprene L–100 | 250 |
| Xylene | 750 |
| Moca | 27.5 |

The Adiprene L–100 was first heated to 170° F. The xylene was slowly added to the Adiprene L–100 while continuously blending the mixture. The Moca was melted at 220° F. and blended into the mixture in the same manner. A steel roll, having a primer coat, was pre-heated to an estimated 110° F. prior to spray application. Ninety pounds air pressure was used to spray the product or coating composition. The spray gun was held at a distance of 10 inches ±2 inches while the roll was slowly rotated at 100–200 r.p.m. Upon completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE VI

| Component: | Parts-by-weight, grs. |
|---|---|
| Adiprene L–100 | 250 |
| Methyl-isobutyl ketone | 750 |
| Moca | 27.5 |

The Adiprene L–100 was first heated to 170° F. The methyl-isobutyl ketone was slowly added to the Adiprene L–100 while continuously blending the mixture. The Moca was melted at 220° F. and blended into the mixture in the same manner. A steel roll, having a primer coat, was pre-heated to an estimated 110° F. prior to spray application. Ninety pounds air pressure was used to spray the product or coating composition. The spray gun was held at a distance of 10 inches ±2 inches while the roll was slowly rotated at 100–200 r.p.m. Upon the completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE VII

| Component: | Parts-by-weight, grs. |
|---|---|
| Adiprene L–100 | 250 |
| Cyclohexanone | 750 |
| Moca | 27.5 |

The Adiprene L–100 was first heated to 170° F. The cyclohexanone was slowly added to the Adiprene L–100 while continuously blending the mixture. The Moca was melted at 220° F. and blended into the mixture in the same manner. A steel roll, having a primer coat, was pre-heated to an estimated 110° F. prior to spray application. Ninety pounds air pressure was used to spray the product or coating composition. The spray gun was held at a distance of 10 inches ±2 inches while the roll was slowly rotated at 100–200 r.p.m. Upon the completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE VIII

| Component: | Parts-by-weight, grs. |
|---|---|
| Adiprene L–100 | 250 |
| Benzene | 750 |
| Moca | 27.5 |

The Adiprene L–100 was first heated to 170° F. The benzene was slowly added to the Adiprene L–100 while continuously blending the mixture. The Moca was melted at 220° F. and blended into the mixture in the same manner. A steel roll, having a primer coat, was pre-heated to an estimated 110° F. prior to spray application. Ninety pounds air pressure was used to spray the product or coating composition. The spray gun was held at a distance of 10 inches ±2 inches while the roll was slowly rotated at 100–200 r.p.m. Upon completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE IX

| Component: | Parts-by-weight, grs. |
|---|---|
| Adiprene L–100 | 250 |
| Ethyl alcohol | 750 |
| Moca | 27.5 |

The Adiprene L–100 was first heated to 170° F. The ethyl alcohol was slowly added to the Adiprene L–100 while continuously blending the mixture. The Moca was melted at 220° F. and blended into the mixture in the same manner. A steel roll, having a primer coat, was pre-heated to an estimated 110° F. prior to spray application. Ninety pounds air pressure was used to spray the product or coating composition. The spray gun was held at a distance of 10 inches ±2 inches while the roll was slowly rotated at 100–200 r.p.m. Upon completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE X

| Component: | Parts-by-weight, grs. |
|---|---|
| Adiprene L–100 | 250 |
| Carbon tetrachloride | 750 |
| Moca | 27.5 |

The Adiprene L–100 was first heated to 170° F. The carbon tetrachloride was slowly added to the Adiprene L–100 while continuously blending the mixture. The Moca was melted at 220° F. and blended into the mixture in the same manner. A steel roll, having a prime coat, was pre-heated to an estimated 110° F. prior to spray application. Ninety pounds air pressure was used to spray the product or coating composition. The spray gun was held at a distance of 10 inches ±2 inches while the roll was slowly rotated at 100–200 r.p.m. Upon completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE XI

| Component: | Parts-by-weight, grs. |
|---|---|
| Adiprene L–100 | 250 |
| Ethylene dichloride | 750 |
| Moca | 27.5 |

The Adiprene L–100 was first heated to 170° F. The ethylene dichloride was slowly added to the Adiprene L–100 while continuously blending the mixture. The Moca was melted at 220° F. and blended into the mixture in the same manner. A steel roll, having a primer coat, was pre-heated to an estimated 110° F. prior to spray application. Ninety pounds air pressure was used to spray the product or coating composition. The spray gun was held at a distance of 10 inches ±2 inches while the roll was slowly rotated at 100–200 r.p.m. Upon completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE XII

| Component: | Parts-by-weight, grs. |
|---|---|
| Adiprene L–100 | 250 |
| Acetone | 750 |
| Moca | 27.5 |

The Adiprene L–100 was first heated to 170° F. The acetone was slowly added to the Adiprene L–100 while continuously blending the mixture. The Moca was melted at 220° F. and blended into the mixture in the same manner. A steel roll, having a primer coat, was pre-heated to an estimated 110° F. prior to spray application. Ninety pounds air pressure was used to spray the product or coating compositoin. The spray gun was held at a distance of 10 inches ±2 inches while the roll was slowly rotated at 100–200 r.p.m. Upon completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE XIII

| Component: | Parts-by-weight, grs. |
|---|---|
| Adiprene L-100 | 250 |
| Methyl ethyl ketone | 750 |
| Moca | 27.5 |

The Adiprene L-100 was first heated to 170° F. The methyl ethyl ketone was slowly added to the Adiprene L-100 while continuously blending the mixture. The Moca was melted at 220° F. and blended into the mixture in the same manner. A steel roll, having a primer coat, was pre-heated to an estimated 110° F. prior to spray application. Ninety pounds air pressure was used to spray the product or coating composition. The spray gun was held at a distance of 10 inches ±2 inches while the roll was slowly rotated at 100–200 r.p.m. Upon completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE XIV

| Component: | Parts-by-weight, grs. |
|---|---|
| Adiprene L-100 | 250 |
| Toluene | 750 |
| Moca | 27.5 |

The Adiprene L-100 was first heated to 170° F. The toluene was slowly added to the Adiprene L-100 while continuously blending the mixture. The Moca was melted at 220° F. and blended into the mixture in the same manner. A steel roll, having a primer coat, was pre-heated to an estimated 100° F. prior to spray application. Ninety pounds air pressure was used to spray the product or coating composition. The spray gun was held at a distance of 10 inches ±2 inches while the roll was slowly rotated at 100–200 r.p.m. Upon completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE XV

| Component: | Parts-by-weight, grs. |
|---|---|
| Adiprene L-100 | 250 |
| Methyl chloroform | 750 |
| Moca | 27.5 |

The Adiprene L-100 was first heated to 170° F. The methyl chloroform was slowly added to the Adiprene L-100 while continuously blending the mixture. The Moca was melted at 220° F. and blended into the mixture in the same manner. A steel roll, having a primer coat, was pre-heated to an estimated 110° F. prior to spray application. Ninety pounds air pressure was used to spray the product or coating composition. The spray gun was held at a distance of 10 inches ±2 inches while the roll was slowly rotated at 100–200 r.p.m. Upon completion of the spray application, heat, estimated to be 110–120° F. surface temperature, was again applied to the roll for ten hours. The cured film thickness was approximately .006 to .011 inch and abrasion resistant. This roll was a power drive roll for a belt sanding machine.

EXAMPLE XVI

| Component: | Parts-by-weight, grs. |
|---|---|
| Adiprene L-100 | 250 |
| Tetrohydrofuran | 750 |
| Moca | 27.5 |

The Adiprene L-100 was first heated to 170° F. The tetrahydrofuran was slowly added to the Adiprene L-100 while continuously blending the mixture. The Moca was melted at 220° F. and blended into the mixture in the same manner. A steel roll, having a primer coat, was pre-heated to an estimated 110° F. prior to spray application. Ninety pounds air pressure was used to spray the product or coating composition. The spray gun was held at a distance of 10 inches ± 2 inches while the roll was slowly rotated at 100–200 r.p.m. Upon completion of the spray application, heat, estimated to be 110–120° F. surface temperature, was again applied to the roll for ten hours. The cured film thickness was approximately .006 to .011 inch and abrasive resistant. This roll was a power drive roll for a belt sanding machine.

The mixture of Adiprene L–100, solvent and Moca is applied to the back of sanding belts for sanding plywood panels. Test results illustrating the value of this coating composition are presented in following Table I.

TABLE I

| Belt | Number of Panels Sanded Before Application of Coating Composition | Number of Panels Sanded After Application of Coating Composition |
|---|---|---|
| Type 1—Lower Belt, Primary Head | 7,038 | 13,782 |
| Type 2—Upper Belt, Primary Head | 8,502 | 14,894 |

From Table I it is seen that the application of the coating composition to a sanding belt makes it possible to sand many more plywood panels than with a belt not having the benefit of the coating composition.

In following Table II there is presented the results of the application of a mixture of Example I Adiprene L–100, trichloroethylene and Moca to the back of sanding belts for sanding plywood panels.

TABLE II

| Belt | Hours of Belt Usage Before Application of Coating Composition | Hours of Belt Usage After Application of Coating Composition |
|---|---|---|
| Type 1—Lower Belt, Primary Head | 13 | 33.5 |
| Type 2—Upper Belt, Primary Head | 20 | 42 |

From Table II it is seen that the application of the coating composition to a sanding belt makes it possible to use the sanding belt many more hours than for a belt not having the benefit of the coating composition.

This mixture of Adiprene L–100 organic solvent and Moca in addition to being used on belts and fabrics and steel rolls to increase friction the mixture may be used as a water resistant adhesive for plywood. Also, this mixture has been used to band together bricks, and a roofing material. The mixture has been painted or brushed on a roof to patch holes and to stop leaks. Also, the coating composition may be applied to tanks as a lining for the tank.

The catalyst Moca is 4,4'-methylene-bis-(2-chloraniline).

The organic solvent such as trichloroethylene is added to the mixture for ease of application of the polyurethane elastomer to the substrate such as cloth, fabric, metal rolls, belts, wood and brick. The organic solvent dissipates out of the coating composition to leave the polyurethane elastomer. The curing of the mixture at room temperature for a number of hours or a few days may be considered to be an initial cure. Then, the final cure may be at an elevated temperature in the range of 160–180° F. for a few hours. The cured coating composition is tough and abrasion resistant.

In some instances after the coating composition has been manufactured it may be desirable to filter the composition. After filtering it may be easier to spray the coating composition or to brush on the coating composition.

What we claim is:

1. A process for preparing a liquid solution of an isocyanate terminated polyurethane said process comprising:
   (a) adjusting the temperature of the polyurethane to a temperature in the range of approximately 70–170° F.;
(b) mixing the polyurethane with an organic solvent to form an organic solvent-polyurethane solution;
(c) there being approximately 80–300 parts-by-weight of the organic solvent to approximately 100 parts-by-weight of the polyurethane;
(d) adjusting the temperature of the organic solvent-polyurethane solution to a temperature in the range of approximately 140–170° F.;
(e) adjusting the temperature of 4,4'-methylene-bis-(2-chloraniline) to a temperature in the range of 210–270° F.;
(f) there being approximately 9–13 parts-by-weight of the 4,4'-methylene-bis-(2-chloraniline); and,
(g) mixing the 4,4'-methylene-bis-(2-chloraniline) and the organic solvent-polyurethane solution to form the liquid solution and adjusting the temperature of the liquid solution to a temperature range of 140–170° F.

2. A process for preparing a liquid solution of a polyalkylene ether glycol organic diisocyanate elastomer, said process comprising:
(a) adjusting the temperature of the polyalkylene ether glycol organic diisocyanate elastomer to a temperature in the range of approximately 70–170° F.;
(b) mixing the polyalkylene ether glycol organic diisocyanate elastomer with an organic solvent to form an organic solvent-polyalkylene ether glycol organic diisocyanate elastomer solution;
(c) there being approximately 80–300 parts-by-weight of the organic solvent to approximately 100 parts-by-weight of the polyalkylene ether glycol organic diisocyanate elastomer;
(d) adjusting the temperature of the organic solvent-polyalkylene ether glycol organic diisocyanate elastomer solution to a temperature in the range of approximately 140–170° F.;
(e) adjusting the temperature of 4,4'-methylene-bis-(2-chloraniline) to a temperature in the range of approximately 210–270° F.;
(f) there being approximately 9–13 parts-by-weight of the 4,4'-methylene-bis-(2-chloraniline); and
(g) mixing the 4,4'-methylene-bis-(2-chloraniline) and the organic solvent-polyalkylene ether glycol organic diisocyanate elastomer solution to form the liquid solution and adjusting the temperature of the liquid solution to a temperature in the range of 140–170° F.

3. A method for preparing and for applying a coating composition, said composition prepared by:
(a) adjusting the temperature of an isocyanate terminated polyurethane to a temperature in the range of approximately 70–170° F.;
(b) mixing the polyurethane with an organic solvent to form an organic solvent-solution;
(c) there being approximately 80–300 parts-by-weight of the organic solvent to approximately 100 parts-by-weight of the polyurethane;
(d) adjusting the temperature of the organic solvent-polyurethane solution to a temperature in the range of approximately 140–170° F.;
(e) adjusting the temperature of 4,4'-methylene-bis-(2-chloraniline) to a temperature in the range of 210–270° F.;
(f) there being approximately 9–13 parts-by-weight of the 4,4'-methylene-bis-(2-chloraniline);
(g) mixing the 4,4'-methylene-bis-(2-chloraniline) and the organic solvent-polyurethane solution to form the liquid solution and adjusting the temperature of the liquid solution to a temperature in the range of 140–170° F.;
(h) applying said liquid solution as the coating composition to a substrate;
(i) curing the coating composition at room temperature; and,
(j) subjecting the coating composition to a temperature in the range of 160–180° F. to further cure the coating composition.

4. A method for preparing and for applying a coating composition, said composition prepared by:
(a) adjusting the temperature of a polyalkylene ether glycol organic diisocyanate elastomer to a temperature in the range of approximately 70–170° F.;
(b) mixing the polyalkylene ether glycol organic diisocyanate elastomer with an organic solvent to form a trichloroethylene-polyalkylene ether glycol organic diisocyanate elastomer solution;
(c) there being approximately 80–300 parts-by-weight of the organic solvent to approximately 100 parts-by-weight of the polyalkylene ether glycol organic diisocyanate elastomer;
(d) adjusting the temperature of the organic solvent-polyalkylene ether glycol organic diisocyanate elastomer solution to a temperature in the range of approximately 140–170° F.;
(e) adjusting the temperature of 4,4'-methylene-bis-(2-chloraniline) to a temperature in the range of approximately 210–270° F.;
(f) there being approximately 9–13 parts-by-weight of the 4,4'-methylene-bis-(2-chloraniline);
(g) mixing the 4,4'-methylene-bis-(2-chloraniline) and the organic solvent-polyalkylene ether glycol organic diisocyanate elastomer solution to form the liquid solution and adjusting the temperature of the liquid solution to a temperature in the range of 140–170° F.;
(h) applying said liquid solution as the coating composition to a substrate;
(i) curing the coating composition at room temperature; and,
(j) subjecting the coating composition to a temperature in the range of 160–180° F. to further cure the coating composition.

5. A process for preparing a liquid solution of an isocyanate terminated polyurethane, said process comprising:
(a) adjusting the temperature of the polyurethane to a temperature in the range of approximately 70–170° F.;
(b) mixing the polyurethant with trichloroethylene to form a trichloroethylene-polyurethane solution;
(c) there being approximately 80–300 parts-by-weight of the trichloroethylene to approximately 100 parts-by-weight of the polyurethane;
(d) adjusting the temperature of the trichloroethylene-polyurethane solution to a temperature in the range of approximately 140–170° F.;
(e) adjusting the temperature of 4,4'-methylene-bis-(2-chloraniline) to a temperature in the range of 210–270° F.;
(f) there being approximately 9–13 parts-by-weight of the 4,4'-methylene-bis-(2-chloraniline); and,
(g) mixing the 4,4'-methylene-bis-(2-chloraniline) and the trichloroethylene-polyurethane solution to form the liquid solution and adjusting the temperature of the liquid solution to a temperature range of 140–170° F.

6. A process for preparing a liquid solution of a polyalkylene ether glycol organic diisocyanate elastomer, said process comprising:
(a) adjusting the temperature of the polyalkylene ether glycol organic diisocyanate elastomer to a temperature in the range of approximately 70–170° F.;
(b) mixing the polyalkylene ether glycol organic diisocyanate elastomer with trichloroethylene to form a trichloroethylene-polyalkylene ether glycol organic diisocyanate elastomer solution;
(c) there being approximately 80–300 parts-by-weight of the trichloroethylene to approximately 100 parts-by-weight of the polyalkylene ether glycol organic diisocyanate elastomer;

(d) adjusting the temperature of the trichloroethylene-polyalkylene ether glycol organic diisocyanate elastomer solution to a temperature in the range of approximately 140–170° F.;
(e) adjusting the temperature of 4,4'-methylene-bis-(2-chloraniline) to a temperature in the range of approximately 210–270° F.;
(f) there being approximately 9–13 parts-by-weight of the 4,4'-methylene-bis-(2-chloraniline); and,
(g) mixing the 4,4'-methylene - bis - (2 - chloraniline) and the trichloroethylene-polyalkylene ether glycol organic diisocyanate elastomer solution to form the liquid solution and adjusting the temperature of the liquid solution to a temperature in the range of 140–170° F.

7. A method for preparing and for applying a coating composition prepared by:
(a) adjusting the temperature of an isocyanate terminated polyurethane to a temperature in the range of approximately 70–170° F.;
(b) mixing the polyurethane with trichloroethylene to form a trichloroethylene-polyurethane solution;
(c) there being approximately 80–300 parts-by-weight of the trichloroethylene to approximately 100 parts-by-weight of the polyurethane;
(d) adjusting the temperature of the trichloroethylene-polyurethane solution to a temperature in the range of approximately 140–170° F.;
(e) adjusting the temperature of 4,4'-methylene-bis-(2-chloraniline) to a temperature in the range of 210–270° F.;
(f) there being approximately 9–13 parts-by-weight of the 4,4'-methylene-bis-(2-chloraniline) to a temperature in the range of 210–270° F.;
(g) mixing the 4,4'-methylene-bis-(2-chloraniline) and the trichloroethylene-polyurethane solution to form the liquid solution and adjusting the temperature of the liquid solution to a temperature in the range of 140–170° F.;
(h) applying said liquid solution as the coating composition to a substrate;
(i) curing the coating composition at room temperature; and,
(j) subjecting the coating composition to a temperature in the range of 160–180° F. to further cure the coating composition.

8. A method for preparing and for applying a coating composition, said composition prepared by:
(a) adjusting the temperature of the polyalkylene ether glycol organic diisocyanate elastomer to a temperature in the range of approximately 70–170° F.;
(b) mixing the polyalkylene ether glycol organic diisocyanate elastomer with trichloroethylene to form a trichloroethylene-polyalkylene ether glycol organic diisocyanate elastomer solution;
(c) there being approximately 80–300 parts-by-weight of the trichloroethylene to approximately 100 parts-by-weight of the polyalkylene ether glycol organic diisocyanate elastomer;
(d) adjusting the temperature of the trichloroethylene-polyalkylene ether glycol organic diisocyanate elastomer solution to a temperature in the range of approximately 140–170° F.;
(e) adjusting the temperature of 4,4'-methylene-bis-(2-chloraniline) to a temperature in the range of approximately 210–270° F.;
(f) there being approximately 9–13 parts-by-weight of the 4,4'-methylene-bis-(2-chloraniline);
(g) mixing the 4,4'-methylene-bis-(2-chloraniline) and the trichloroethylene-polyalkylene ether glycol organic diisocyanate elastomer solution to form the liquid solution and adjusting the temperature of the liquid solution to a temperature in the range of 140–170° F.;
(h) applying said liquid solution as the coating composition to a substrate;
(i) curing the coating composition at room temperature; and,
(j) subjecting the coating composition to a temperature in the range of 160–180° F. to further cure the coating composition.

References Cited

UNITED STATES PATENTS

| | | | |
|---|---|---|---|
| 3,027,276 | 3/1962 | Cohen et al. | 117—161 X |
| 3,036,996 | 5/1962 | Kogon | 260—77.5 |
| 3,135,711 | 6/1964 | Thoma et al. | 117—161 X |
| 3,188,302 | 6/1965 | Lorenz | 260—77.5 |
| 3,194,793 | 7/1965 | Kogon | 260—77.5 X |
| 3,261,813 | 7/1966 | Ramos | 260—77.5 |
| 3,264,249 | 8/1966 | Araki et al. | 260—33.6 X |
| 3,316,220 | 4/1967 | Ramos | 260—77.5 |

WILLIAM D. MARTIN, *Primary Examiner.*

M. LUSIGNAN, *Assistant Examiner.*